United States Patent Office 3,573,187
Patented Mar. 30, 1971

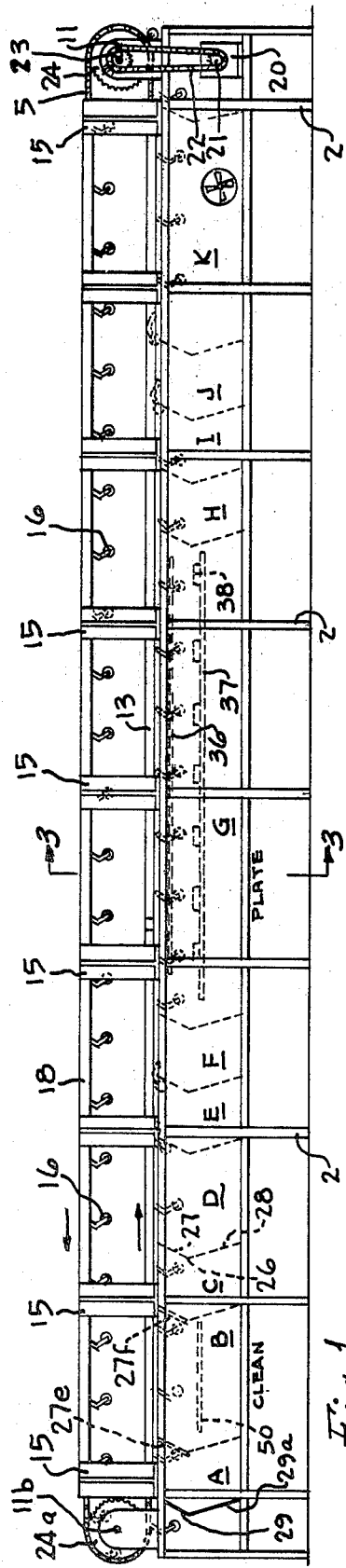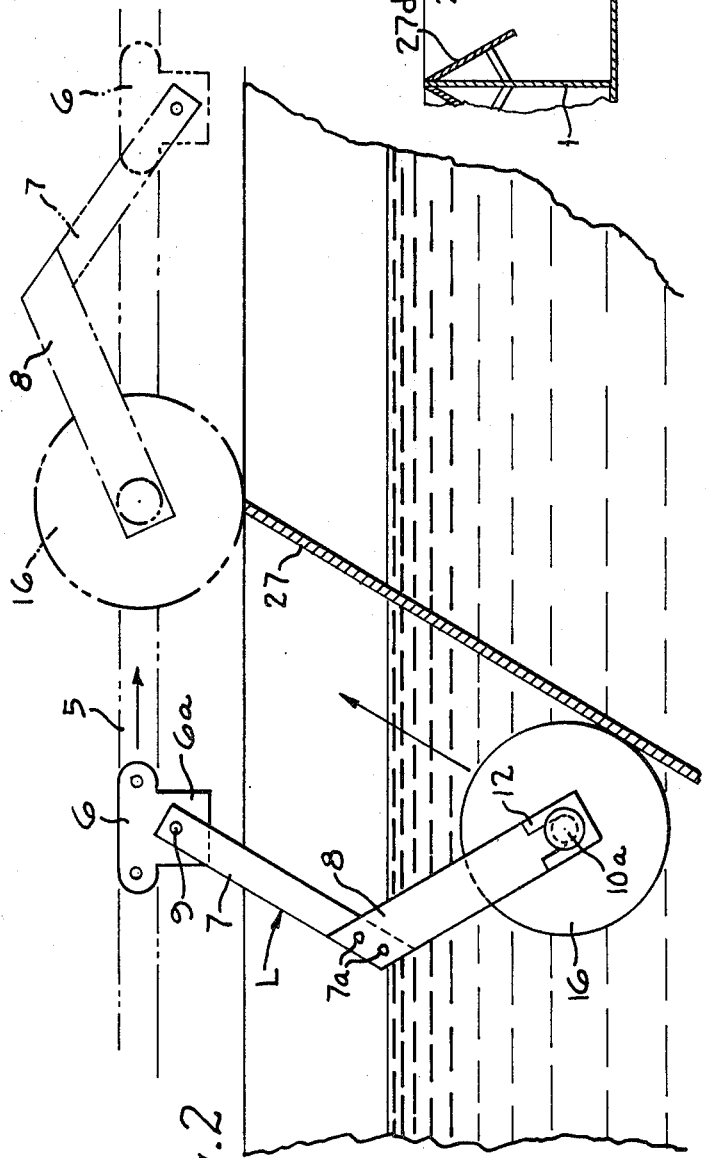

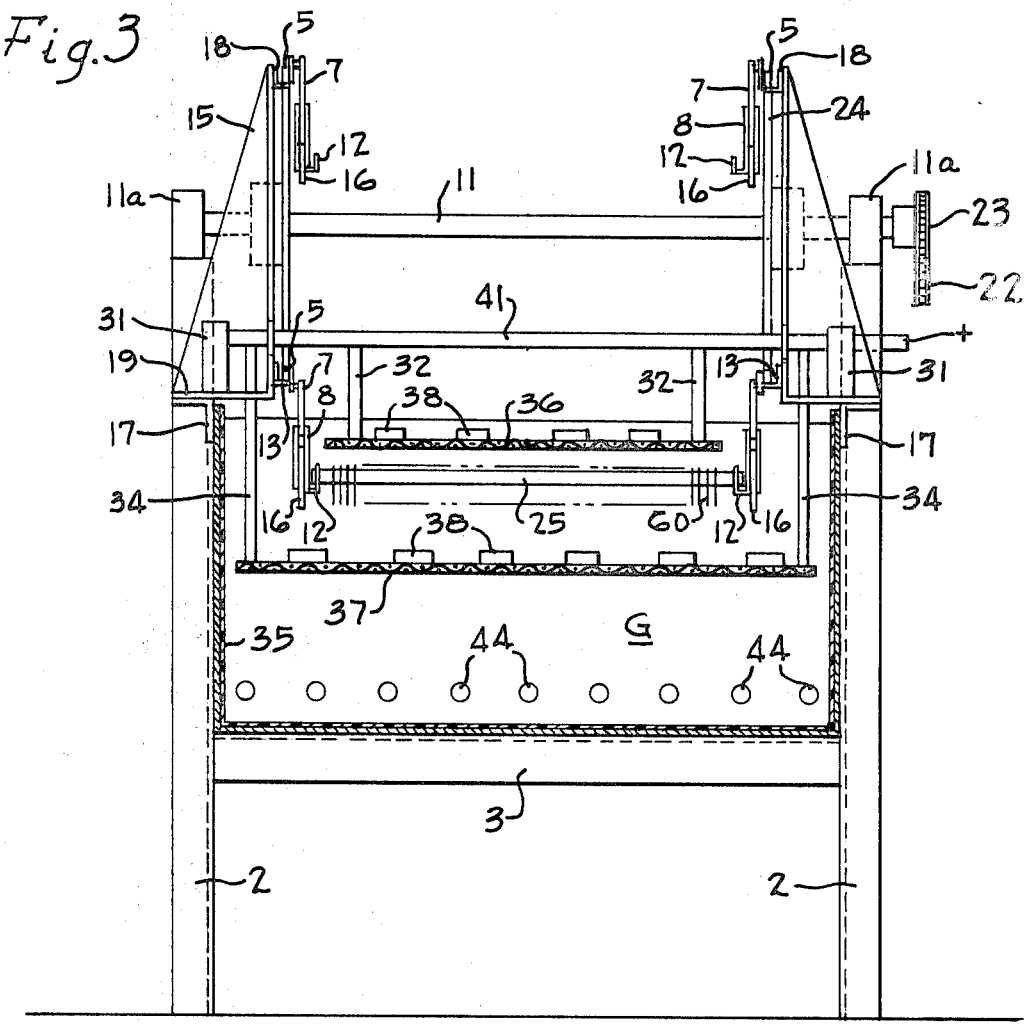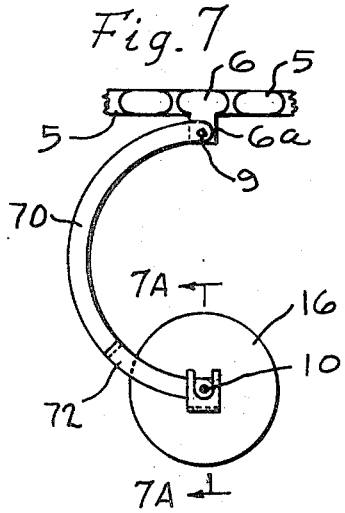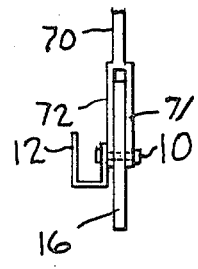

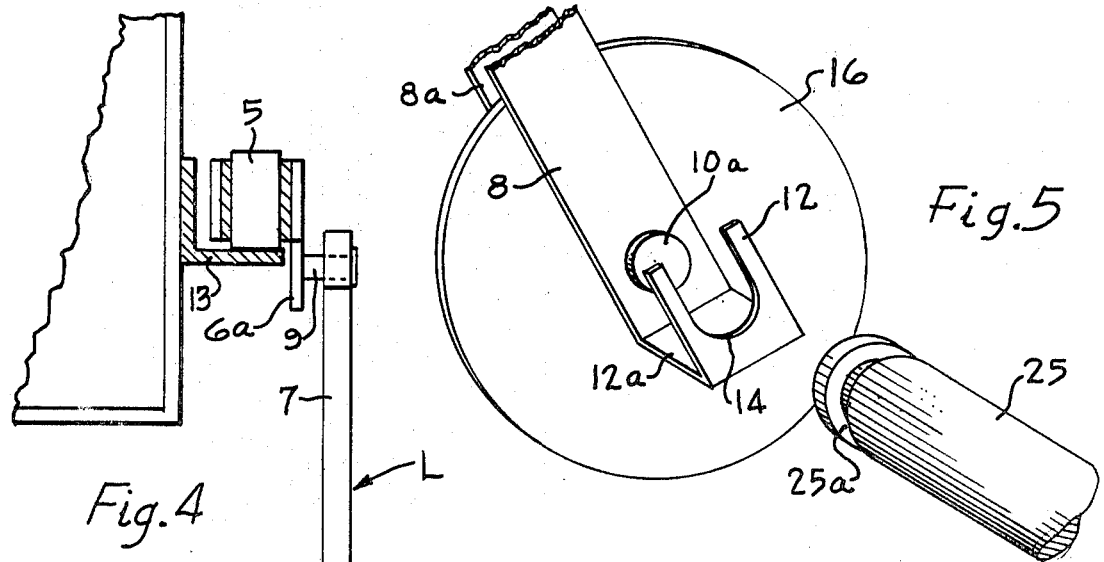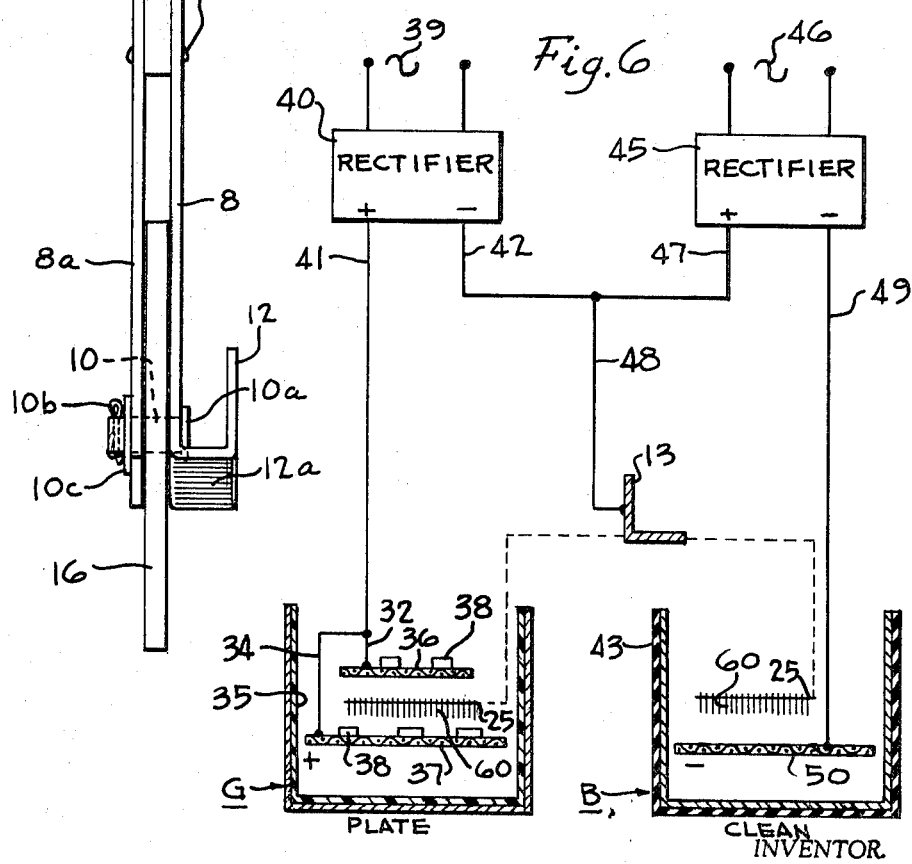

3,573,187
APPARATUS FOR PROCESSING ARTICLES
Frederick W. Stakelbeck, Philadelphia, Pa., assignor to Philadelphia Rust-Proof Company, Philadelphia, Pa.
Filed May 6, 1969, Ser. No. 822,146
Int. Cl. B01k 3/00; C23b 5/68
U.S. Cl. 204—203                                        9 Claims

ABSTRACT OF THE DISCLOSURE

This invention relates to apparatus adapted to transport continuously a plurality of articles suspended on removable work-supports through a series of longitudinally aligned chambers or tanks for suitably processing the articles successively in the aligned chambers. The work-supports are conveyed by a pair spaced horizontally positioned endless parallel travelling chains or belts extending in a straight line and located at the top of the tanks. The rear end wall of each tank is provided with a sloping or inclined runway or guideway extending downwardly within each tank and terminating at the upper edge thereof. A plurality of spaced pairs of freely rotatable guide wheels are carried on swingable levers which are hinged on spaced links of the conveyor chains. The guide wheels are adapted to make rolling contact with the sloping guideways of each chamber or tank and to travel upwardly on said guideways until they reach the top of the chamber or tank and then automatically drop by gravity into the next adjacent chamber.

FIELD OF THE INVENTION

This invention relates to conveying apparatus adapted for continuous operation to transport and immerse a large number of small articles in a plurality of successive baths for suitable processing, such as electroplating metal articles. In electroplating metal articles a large number of separate preparatory and final treatments are required, such as cleaning, washing, plating, final washing and drying. Each of these treatments must be carried out in a series of separate tanks containing suitable treating baths. The articles to be plated must be successively immersed in each tank, then removed and immersed in the next successive tank, until the entire sequence of treatments is accomplished. Each treatment must also be carried out for a suitable period of time which may differ for each individual treatment. The present invention provides means for carrying out such processing sequence in an automatic and continuous manner. The apparatus is relatively simple in construction and requires very little maintenance and repairs as will be evident from the detailed description of an illustrative embodiment of the invention.

DESCRIPTION OF THE PRIOR ART

In plating small articles, such as small metal clips, springs, and the like, it has been customary to place such articles in reticulated baskets which are immersed in the treating baths for plating such articles. The baskets are shaken or rotated to change the points of contact of the small articles as they are being plated in order to obtain a continuous electrodeposited coating. In such apparatus complicated drive mechanism is required to convey the baskets through the baths.

Articles have also been plated by suspending them separately on racks or work-supports which are mechanically conveyed and transferred to different baths. In such apparatus, the conveying mechanism and the transfer mechanism are usually separate devices, and the transfer devices pick the work-support racks off from the conveyor, which moves steadily in a horizontal plane, lifts the work up and deposits the work in the next tank at about the same position on the conveyor. In such machines the movement of the transfer arms must be synchronized with the movement of the conveyor and in relation to the supporting elements on the conveyor. Such apparatus involves many mechanical parts and drives which must be synchronized and serviced. Considerable maintenance and repairs are constantly required in using such equipment.

SUMMARY OF THE INVENTION

According to the present invention, small articles which are to be electroplated, or subjected to other desired processing such as lacquering, painting, etc., are freely suspended on removable elongate rods or work-supports which are continuously transported at a constant rate by a pair of endless conveyor chains through a series of successive treating chambers or tanks. The work-supports carrying the suspended articles to be processed are manually loaded at the loading end of the conveyor and manually removed at the emerging or unloading end. The elongate rods are carried at each of their ends in opposed pairs of holders or brackets provided on swingable levers freely pivoted on the conveyor chains. Each of the swingable levers also carries at the lower end thereof a freely rotatable guide wheel. These guide wheels are adapted to make rolling contact with an inclined guideway provided at the end walls of each tank and to travel upwardly on said inclined guideway until they reach the top rear edge of the tank and then automatically drop by gravity into the next adjacent tank while carried on the swingable arms. This sequence is repeated in each successive tank in the series. The time for specific treatment of the articles in each tank is determined by the length of each tank which is predetermined for the desired processing.

BRIEF DESCRIPTION OF THE DRAWINGS

An illustrative embodiment of the invention is shown in the accompanying drawings wherein:

FIG. 1 is an elevational side view of an apparatus for conveying metal articles and for electroplating them, FIG. 2 is an enlarged fragmental side view showing a portion of the conveyor chain carrying a swingable lever and guide wheel, FIG. 2A is a fragmental sectional view of a modified construction of the tanks, FIG. 3 is a transverse sectional view taken on lines 3—3 of FIG. 1, FIG. 4 is an enlarged side view of a swingable lever carrying a guide wheel, FIG. 5 is an enlarged fragmental perspective view of the lower arm of a swingable lever showing a retaining bracket or holder for receiving one end of a removable work-support rod, FIG. 6 shows a diagrammatic electrical circuit for supplying D.C. current to the electroplating tank and electro-cleaning tank, FIG. 7 is an enlarged fragmental side view of a modified construction of the swingable levers carrying a guide wheel, and FIG. 7A is a fragmental sectional view taken on lines 7a—7a of FIG. 7.

DESCRIPTION OF AN ILLUSTRATIVE EMBODIMENT OF THE INVENTION

An illustrative embodiment of the invention is shown in the accompanying drawings for electroplating small metal wire hooks, designated by numeral 60 in FIG. 3. A plurality of these wire hooks are loosely supported side by side on removable work-support rods 25 which are continuously transported through a series of longitudinally aligned processing tanks, designated by letters A through J (see FIG. 1) containing suitable liquids, and finally through a drying chamber K. The tanks are supported on spaced upright frame members 2 and crossmembers 3. The work-support rods 25 are manually loaded by freely suspending thereon a plurality of aligned clips 60 which are to be electroplated. The loaded rods 25 are manually positioned by an operator at the loading end (see the left end of FIG. 1 adjacent tank A) of a pair of spaced travelling endless conveyor metal pivoted link chains. The endless chains are driven at a constant speed by motor 20, drive sprocket 21, drive chain 22, and driven sprocket 23 on shaft 11 carried by bearings 11a, (shown in FIG. 3) which in turn drives spaced sprockets 24 engaging the conveyor chains 5. The conveyor chains return at the loading end over spaced idler sprockets 24a carried on shaft 11b.

The chains 5 are provided at spaced intervals with pivoted links 6, shown in FIG. 2, which are provided with integral dependent lugs 6a. The lugs 6a carry a pin 9 positioned at right angles to the line of travel of the conveyor chains 5. A swingable composite lever designated generally by L is hinged on pin 9. Each swingable lever L is formed of an upper arm 7 and two spaced lower arms 8 and 8a. The upper end of arm 7 is pivoted on pin 9 and is free to swing at any angle to the horizontal. The lower end of arm 7 is connected by rivets 7a to a pair of spaced lower arms 8 and 8a which carry at their lower ends a stub shaft 10 (see FIG. 4) having an integral stub head 10a at one end and at the other end a hole to receive a cotter pin 10b spaced from lower arm 8a by a washer 10c. The upper arm 7 and lower arms 8 and 8a are positioned at suitable angle to each other for a purpose to be explained later. The stub shaft 10 carries a freely rotatably guide wheel 16 positioned between the lower ends of arms 8 and 8a, as shown in FIG. 4. If desired, the swingable levers L on which the guide wheels 16 are rotatably mounted may be formed of an integral curvilinear or arcuately shaped arm 70, shown in FIG. 7, one end of which is pivoted on pin 9 to link 6 and the other end is bifurcated, at 71 and 72, as shown in FIG. 7A, for receiving stub shaft 10 on which wheel 16 is rotatably mounted. The dimensions and contour of the swingable levers and the diameter of the wheel 16 are predetermined so that the wheels 16 will travel on inclined wheel guideway 27 and over the top edge of each tank without snagging or jamming. The diameter of the wheels 16 is also predetermined so that the articles 60 to be processed are suspended on work-support rods 25 do not extend beyond the periphery of the wheels 16 so as to avoid scrapping or dragging on the guide panel 27.

The lower end of each arm 8 is provided with an integral metal holder or bracket 12 spaced from the arm 8 by lower wall 12a and having the front wall provided with U-shaped cut out portion 14 (see FIGS. 4 and 5). The brackets 12 are adapted to removably retain and support the ends of the work-support rods 25 which are provided with a groove 25a adjacent each end for receiving and engaging the U-shaped cut portion 14 of the holder or bracket. The arms 7, 8 8a and bracket 12 are made of metal and are connected to be electrically conductive for the purpose to be explained later.

The spaced endless conveyor chains 5 are supported on and travel in a straight line on elongated longitudinally extending metal channels or tracks in their forward and return passes. The conveyor chains are maintained in constant contact with the tracks or channels to make electrical contact therewith. The forward passes of the chains 5 are supported in track or channel members 13 (see FIGS. 1 and 3) which are positioned at the top of aligned tanks A to J and chamber K and are supported by spaced support members 15 positioned on the frame members 17. The return passes of the spaced chains are supported on spaced track or channel members 18 which are retained by support members 15 in position above the lower channel members 13 as shown in FIGS. 1 and 3.

The end walls of each tank or chamber are preferably formed by a single plate member as shown in FIG. 1 which is bent along a transverse fold line 26 to provide an upper panel portion 27 which inclines outwardly in the direction of horizontal travel of the articles conveyed in the tanks; for example at an angle of about 30° from the vertical, as shown in FIGS. 1 and 2, to constitute an inclined guide track for rollers 16. The lower panel portion 28 may also be bent forwardly and extends to the bottom of the tank. The edges of the panel member are preferably welded to the adjacent side walls and bottom walls of the tanks.

The tanks A to J contain liquids for treating the articles to be electroplated. Tank A contains a soak cleaning solution. In tank B the articles are electroplated by means of D.C. current supplied by rectifier 45, shown diagrammatically in FIG. 6, connected to an electric A.C. supply. Tank B is provided with an outer insulation coating 43 to insulate it from the supporting frame member. The inclined trackways 27e and 27f (shown in FIG. 1) of tank B are also provided with a dielectric insulation layer. A cathode metal grid 50 is suitably supported in tank B and is electrically connected to the negative pole of the rectifier 45 by lead 49. The positive pole of the rectifier is connected by leads 47 and 48 and electrically connected to track 13 which supports the travelling conveyor chains 5 in electrical contact therewith. The work-support rods 25 on which the articles 60 are suspended are supported by the metal brackets 12, previously described, which are integral with metal arms 8, and upper metal arm 7 is in electrical contact with the links 6 of the conveyor chain 5. All these elements are thus in electrical contact to convey current from track 13 with which the conveyor chain is in electrical contact. The electric circuit in bath B is thus completed through cathode 50, the cleaning liquid and articles and channel 13.

Tank C provides a water rinse, tank D an acid pickle, tank E a water rinse and tank F an acid neutralizer treatment.

In tank G the plurality of articles 60 are electroplated. Tank G contains a suitable metal salt electrolyte for plating the articles immersed in the bath. The tank is provided with heating coils 44 for heating the bath (see FIG. 3). D.C. current is supplied by bus bar 41 which is electrically connected to the positive pole of rectifier 40 connected to a suitable source 39 of A.C. current (see FIG. 6). The bus bar 41 is supported on insulated blocks 31 which are supported on plates 19 of the upper frame supports 15. Dependent spaced metal bars 32 are electrically connected to the bus bar 41 as shown in FIG. 3 which extend downwardly within tank G. A reticulated or perforated metal anode support 36 is connected to the bars 32 and is suspended thereon. A second lower reticulated or perforated metal anode support 37 is suspended on spaced metal rods 34 extending within tank G. The rods 34 are also electrically connected to bus bar 41 as shown in FIGS. 3 and 6. The spaced upper and lower anode supports are immersed in the electrolytic bath and also support on their upper face a plurality of replaceable metal anode bars 38 which supply the metal ions in the bath. These metal anode bars 38 are movably positioned on the anode supports and are in electrical contact therewith. As shown in FIG. 6, D.C. current supplied by rectifier 40 will flow through bus bar 41, bars 32 and 34, the anode bars, the electrolyte and the travelling articles 60 suspended between the spaced anodes as shown in FIG. 3. The articles 60 suspended on work-support rods 25 are in electrical contact therewith. The rods 25 are electrically connected through the conveyor chain 5 and track member 13, as previously explained, to the negative pole of rectifier 40 by electric leads 42 and 48 as shown in FIG. 6.

Tanks H, I and J contain water baths for washing and rinsing the plated articles. The processed articles then pass through drying chamber K through which warm air is circulated. The finished articles suspended on work-support rods 25 are manually removed by simply lifting the individual rods 25, including the articles suspended thereon, off the brackets 12 as they arrive at the unloading end of the conveyor chains 5 on drive sprockets 24. The work-support rods 25 are manually reloaded with articles 60 and are then manually positioned on brackets 12 at the loading end of the conveyor chains 5 shown at the left end of FIG. 1. An inclined external metal guideway panel 29 is provided at the outside top portion of tank A, which is suitably retained on tank A by support 29a attached to the tank A. The inclined guideway 29 functions in the same manner as the inclined guide panels 27 in the tanks for guiding the guide wheels 16 in their upward travel out of the tanks as previously described.

It is to be understood that instead of suspending individual articles on the work-support members 25, I may suitably suspend perforated metal receptacles or baskets containing a plurality of individual small articles which are to be processed in the tanks.

Numerous changes and modifications may be made of the specific elements previously described which are intended to be included within the scope of this invention. If desired rectangular tanks 1 may be used having normally upright vertically extending end walls 4, as shown in FIG. 2A, which are provided with inclined guideways or trackways 27a attached to the end walls and terminating at the upper edge thereof. These guideways serve to guide guide wheels 16 in the same manner as guideways 27 previously described. Also if desired auxiliary inclined panels or guideways 27d may be provided, as shown in FIG. 2A, at the front end of each tank which serve to guide rollers 16 downwardly in order to reduce splashing of the rollers and suspended articles as they are conveyed downwardly into the tanks containing a liquid.

The angular pivoted levers carrying the guide wheels 16 may be replaced by levers having an arcuate or other shape as shown in FIGS. 7 and 7A as previously described. The apparatus is not necessarily limited to electroplating articles. For example, electrocleaning tank B and electroplating tank G can be replaced by tanks for containing treating liquids for painting, lacquering or other treatment of articles transported therein. The number and length of the individual tanks may be changed depending upon the processing to be carried out.

I claim:

1. Apparatus for continuously processing articles suspended on a series of travelling work-support members comprising:
    a series of aligned tanks disposed end for end in a straight line wherein said articles are successively treated;
    said tanks each having open tops, opposed side walls, and front and rear end walls;
    a guideway beginning at the upper edge of each of said end walls and extending downwardly within each of said tanks and inclined outwardly in the direction of horizontal travel of said articles;
    horizontal conveyor means extending in a straight line along the opposite side walls of said tanks adjacent the upper portion thereof;
    means to drive said conveyor means at a constant speed;
    a series of spaced oppositely disposed pairs of freely swingable levers carried on said conveyor means;
    a freely rotatable guide wheel carried at each end of the free ends of said opposed pair of swingable levers;
    said work-support members being retained at their opposite ends on opposed pairs of said swingable levers;
    said guide wheels being adapted to be transported forwardly in each tank toward said inclined guideway and brought into upward rolling contact with the said inclined guideway thereby simultaneously swinging said pairs of pivoted levers upwardly and out of each tank until the guide wheels roll over the top of the rear end wall of the tank and drop by gravity together with the supporting pair of pivoted levers within the next adjacent tank; and
    said work-support members being simultaneously transported upwardly out of said tank and successively lowered in the next succeeding tank while being retained on said swingable levers.

2. Apparatus as defined in claim 1, wherein the rear end wall of each tank is formed from an integral plate member having upper and lower panels, the upper panel being inclined outwardly in the direction of horizontal travel of the articles conveyed in the tanks to constitute a guideway for guiding the guide wheels thereon for upward travel thereon and out of each tank.

3. Apparatus as defined in claim 2, wherein the front wall of each tank is provided with an inclined panel member extending downwardly in said tank to constitute a guideway for guiding the guide wheels thereon for downward travel into said tank.

4. Apparatus of claim 1, wherein the conveyor means comprises a pair of spaced endless parallel chains formed of a series of pivoted metal chain links, a plurality of spaced links in said series of chain links having integral depending lugs, said freely swingable levers being pivoted on said depending lugs.

5. Apparatus of claim 1, wherein the swingable levers are of angular shape to clear the top of each tank.

6. Apparatus of claim 1, wherein the swingable levers are arcuately shaped.

7. Apparatus of claim 1, wherein an electrocleaning tank is provided at the loading end of the said series of aligned tank, an intermediate electroplating tank and a drying chamber at the emerging end of the said series of chambers.

8. Apparatus of claim 1, wherein the series of tanks comprises an electroplating tank, said tank adapted to contain a metal salt electrolyte bath, a D.C. source of current, a metal anode in said tank in electrical circuit with the positive pole of said D.C. source, the work-support members being immersed in said bath and in electrical circuit through the conveyor means with the negative pole of said D.C. source, the articles suspended on said work-support members being adapted to be immersed in said bath.

9. Apparatus of claim 1, wherein the series of tanks comprises an electrocleaning tank adapted to contain an electrolyte bath wherein the articles suspended on the work-support members are adapted to be immersed in said bath, said work-support members being connected to the positive pole of a D.C. source, and a cathode in said tank in electrical circuit with the negative pole of said D.C. source, said electrical circuit passing through the conveyor means.

References Cited

UNITED STATES PATENTS

| 889,744 | 6/1908 | Backus | 204—202 |
| 2,023,668 | 9/1933 | Daw | 204—203 |
| 2,387,160 | 5/1942 | Loney | 204—202 |

TA-HSUNG TUNG, Primary Examiner

R. J. FAY, Assistant Examiner

U.S. Cl. X.R.

134—77; 198—209; 204—213